(12) United States Patent
Murakami et al.

(10) Patent No.: US 7,504,740 B2
(45) Date of Patent: Mar. 17, 2009

(54) MAGNUS TYPE WIND POWER GENERATOR

(75) Inventors: Nobuhiro Murakami, 32-53, Aza Oiwakenishi, Tenno, Katagami-shi, Akita 010-0101 (JP); Jun Ito, Akita (JP)

(73) Assignees: Mekaro Akita Co., Ltd. (JP); Nobuhiro Murakami (JP)

( * ) Notice: Subject to any disclaimer, the term of this patent is extended or adjusted under 35 U.S.C. 154(b) by 5 days.

(21) Appl. No.: 10/569,581

(22) PCT Filed: Jun. 14, 2004

(86) PCT No.: PCT/JP2004/008321

§ 371 (c)(1),
(2), (4) Date: Feb. 23, 2006

(87) PCT Pub. No.: WO2005/075820

PCT Pub. Date: Aug. 18, 2005

(65) Prior Publication Data

US 2007/0046029 A1 Mar. 1, 2007

(30) Foreign Application Priority Data

Feb. 9, 2004 (JP) .............................. 2004-031897

(51) Int. Cl.
*F03B 5/00* (2006.01)
(52) U.S. Cl. ....................................................... 290/55
(58) Field of Classification Search .................. 290/55, 290/44
See application file for complete search history.

(56) References Cited

U.S. PATENT DOCUMENTS

| | | | | |
|---|---|---|---|---|
| 1,990,573 A | * | 2/1935 | Stone | 244/5 |
| 2,344,515 A | * | 3/1944 | Massey | 244/10 |
| 3,120,275 A | * | 2/1964 | Pfleiderer et al. | 416/4 |
| 3,584,811 A | * | 6/1971 | Leavy et al. | 244/207 |
| 4,366,386 A | | 12/1982 | Hanson | 290/44 |
| 4,446,379 A | * | 5/1984 | Borg et al. | 290/55 |
| 6,375,424 B1 | | 4/2002 | Scarpa | 416/4 |

FOREIGN PATENT DOCUMENTS

| | | | |
|---|---|---|---|
| DE | 3800070 A1 | * | 7/1989 |
| EP | 1 327 773 | | 7/2003 |
| GB | 245134 | | 12/1925 |
| JP | 54-89143 | | 7/1979 |
| JP | 55-40257 | | 3/1980 |
| JP | 55-123379 | | 9/1980 |
| JP | 6-316295 | | 11/1994 |
| JP | 2000-506949 | | 6/2000 |
| JP | 2002-61563 | | 2/2002 |
| JP | 2003-206846 | | 7/2003 |
| RU | 2189494 | | 9/2002 |
| SU | 10198 | | 6/1929 |
| SU | 1663225 | | 7/1991 |
| SU | 1724922 A1 | * | 4/1992 |
| WO | WO 0242640 A1 | * | 5/2002 |

* cited by examiner

OTHER PUBLICATIONS

Autottranslation of JP 06-316295.*

*Primary Examiner*—Joseph Waks
(74) *Attorney, Agent, or Firm*—Hayes Soloway P.C.

(57) ABSTRACT

A Magnus type wind power generator includes a horizontal rotary shaft for transmitting torque to a power generating mechanism. Rotary columns are disposed radially of the horizontal rotary shaft. Driving motors rotatively drive the respective rotary columns around the axes thereof. The relative action between rotation of each rotary column and wind produces Magnus lift, which rotates the horizontal rotary shaft so as to drive the power generating mechanism. An air flow device is installed for producing air flow on the outer peripheral surfaces of the rotary columns so as to increase the Magnus lift.

13 Claims, 13 Drawing Sheets

MAGNUS TYPE WIND POWER GENERATOR

TECHNICAL FIELD

The present invention relates to a Magnus type wind power generator which causes Magnus lift generated by interactions between rotations of respective rotary columns and wind power to rotate a horizontal rotary shaft, thereby driving a power generating mechanism.

BACKGROUND ART

Although, as effective wind power generators, there have been realized ones using a Savonius wind turbine, the Savonius wind turbine cannot rotate faster than a wind speed, presents a low power generation capability, and thus is not suitable for a high power generation. On the other hand, as a practical wind power generator with a relatively high power generation capability, although there are ones using a propeller type wind turbine, they have a problem that the efficiency thereof cannot be increased in a relatively low wind speed range.

In addition to these types, there have already been publicly known Magnus type wind power generators which generate an electric power by causing a required number of rotary columns provided radially with respect to a horizontal rotary shaft to generate Magnus lift thereby rotating the horizontal rotary shaft (refer to patent documents 1 and 2).

Patent document 1: U.S. Pat. No. 4,366,386

Patent document 2: Russian Federation Patent No. 2189494C2

DISCLOSURE OF THE INVENTION

Problems to be Solved by the Invention

A Magnus type wind power generator described in the Patent document 1 generates a power by rotating rotary columns to generate Magnus lift, thereby rotating a horizontal rotary shaft to generate an electric power, and it is thus necessary to increase the rotational speed of the rotary columns to increase the Magnus lift for increasing the amount of the electric power to be generated. However, a large amount of energy is consumed in order to rotate the rotary columns at a high speed, resulting in a decrease of a power generation efficiency.

Moreover, although a Magnus type wind power generator described in the Patent document 2 rotates rotary columns by means of a Savonius rotor rotated by wind power, it is thus possible to eliminate a transmission mechanism for the rotary columns, and simultaneously, it is not necessary to provide driving motors or the like used to rotate the rotary columns, the Savonius rotor cannot rotate faster than the wind speed, and it is thus impossible to increase the rotational speed of the rotary columns, and to generate large Magnus lift, resulting in being unsuitable for an efficient electric power generation.

The present invention provides a Magnus type wind power generator which solves these problems all at once, and generates an electric power efficiently in a wind speed range from a low wind speed to a relatively high wind speed.

Means to Solve the Problems

To solve the above problems, a Magnus type wind power generator includes a horizontal rotary shaft that transmits a rotation torque to a power generating mechanism, a required number of rotary columns that are disposed radially from the horizontal rotary shaft, and driving motors that rotatively drive the respective rotary columns about axes thereof, where Magnus lift generated by interactions between the rotations of the respective rotary columns and wind power is caused to rotate the horizontal rotary shaft to drive the power generating mechanism, is characterized in that at predetermined positions are provided air flow means that generate air flows upon outer peripheral surfaces of the rotary columns so as to increase the Magnus lift.

The present invention is based upon a novel principle that, other than a natural wind and movements of air in surface layers of the rotary columns which rotate with the rotary columns, the Magnus lift generated by the interactions between the rotations of the respective rotary columns and the wind power is increased by generating the air flows upon the outer peripheral surface of the rotary columns, which has been discovered by the inventors, and the inventors have succeeded in increasing the rotation torque of the horizontal rotary shaft which drives the power generation mechanism, thereby remarkably increasing the power generation efficiency of the wind power generator in a wind speed range from the low wind speed to the relatively high wind speed.

In one embodiment of the invention the air flow means are means that generate air flow components at least parallel with axes of the rotary columns upon the outer peripheral surfaces of the rotary columns.

According to this aspect, three dimensional air flows are generated by adding the components of the air flows parallel with the axes of the rotary columns to the Magnus lift generated by the natural wind and the movements of the air in the surface layers of the rotary columns which rotate with the rotary columns, and consequently, the Magnus lift, namely forces applied to the rotary columns, increase, which is experimentally proved. On this occasion, all the air flows generated by the air flow means are not necessarily parallel with the rotary columns, and a sufficient effect is provided if the air flows have at least a vector component parallel with the rotary columns.

In another embodiment of the invention the air flow means are means that generate air flow components parallel with the axes of the rotary columns and in a direction departing from the horizontal rotary shaft upon the outer peripheral surfaces of the rotary columns.

According to this aspect, the Magnus lift generated upon the rotary columns is increased by causing the air flow means to generate the air flows in the direction departing from the horizontal rotary shaft upon the outer peripheral surfaces of the rotary columns.

In yet another aspect of the invention the air flow means are means that generate air flow components parallel with the axes of the rotary columns and in a direction toward the horizontal rotary shaft upon the outer peripheral surfaces of the rotary columns.

According to this aspect, the Magnus lift generated upon the rotary columns is increased by causing the air flow means to generate the air flows in the direction toward the horizontal rotary shaft upon the outer peripheral surfaces of the rotary columns.

In one preferred embodiment of the invention the air flow means are fin members formed upon the outer peripheral surfaces of the rotary columns.

According to this aspect, during the rotation of the rotary columns, the air around the rotary columns is caused to flow by the fin members, thereby increasing the Magnus lift applied to the rotary columns.

In another embodiment of the invention the fin members serving as the air flow means are ribs in a spiral shape formed upon the outer peripheral surfaces of the rotary columns.

According to this aspect, during the rotation of the rotary columns, it is possible to cause the air to evenly and stably flow upon wide surfaces of the rotary columns by means of the ribs in the spiral shape, thereby increasing the Magnus lift, and reducing wind noises.

In a preferred embodiment of the invention end caps larger in diameter than the rotary columns are provided upon extreme ends of the rotary columns.

According to this aspect, it has experimentally been proven that the Magnus effect increases if the end caps are provided when the air flows are generated, and according to experiments, if there are provided the end caps, the Magnus effect increases by the method where the air is caused to flow in the direction toward the horizontal rotary shaft compared with the method where the air is caused to flow radially outward in the opposite direction.

In yet another preferred embodiment of the invention the ribs forming the air flow means are constructed by multi-streak spirals.

According to this aspect, by providing the multi-streak spirals, more air can be caused to smoothly flow upon the surfaces of the rotary columns thereby increasing the Magnus effect without increasing the diameter of the spirals.

In another aspect of the invention multiple dimples are provided upon the outer peripheral surfaces of the rotary columns.

According to this aspect, upon the rotary columns being rotating about the axes thereof, the multiple dimples disturb surface layer flows (boundary layer) of the rotary columns, thereby restraining separation of the surface layer flows to increase circulation, resulting in additionally increasing the Magnus lift generated upon the rotary columns. The dimples may be recesses and projections in any shape as long as they disturb the surface layer flows.

In yet another aspect of the invention dimples or projections are formed upon outer surfaces of the extreme ends of the ribs.

According to this aspect, the dimples or projections disturb surface layer flows (boundary layer) of the outer surfaces of the extreme ends of the ribs, thereby restraining the separation of the surface layer flows to increase the circulation, resulting in additionally increasing the Magnus lift.

Preferably the rotary columns are supported for extension and contraction in the radial direction with respect to the horizontal rotary shaft.

According to this aspect, since the rotary columns freely extend and contract, the electric power can be generated while the rotary columns are extended or contracted according to the direction and the wind speed of the natural wind, and it is possible to extend the rotary columns to maximize an area to receive the wind thereby increasing the lift of the rotary columns under a normal condition, and to contract the rotary columns to reduce the area to receive the wind thereby preventing a support base from being destructed, and preventing the rotary columns from being damaged upon a strong wind.

In still another aspect of the invention the driving motors are fewer in number than the required number of the rotary columns are used to drive rotatively the respective rotary columns simultaneously.

According to this aspect it is possible to save an electric power used to drive the driving motors, thereby increasing the power generation efficiency of the wind power generator.

DESCRIPTION OF NUMERALS

Figure 1:
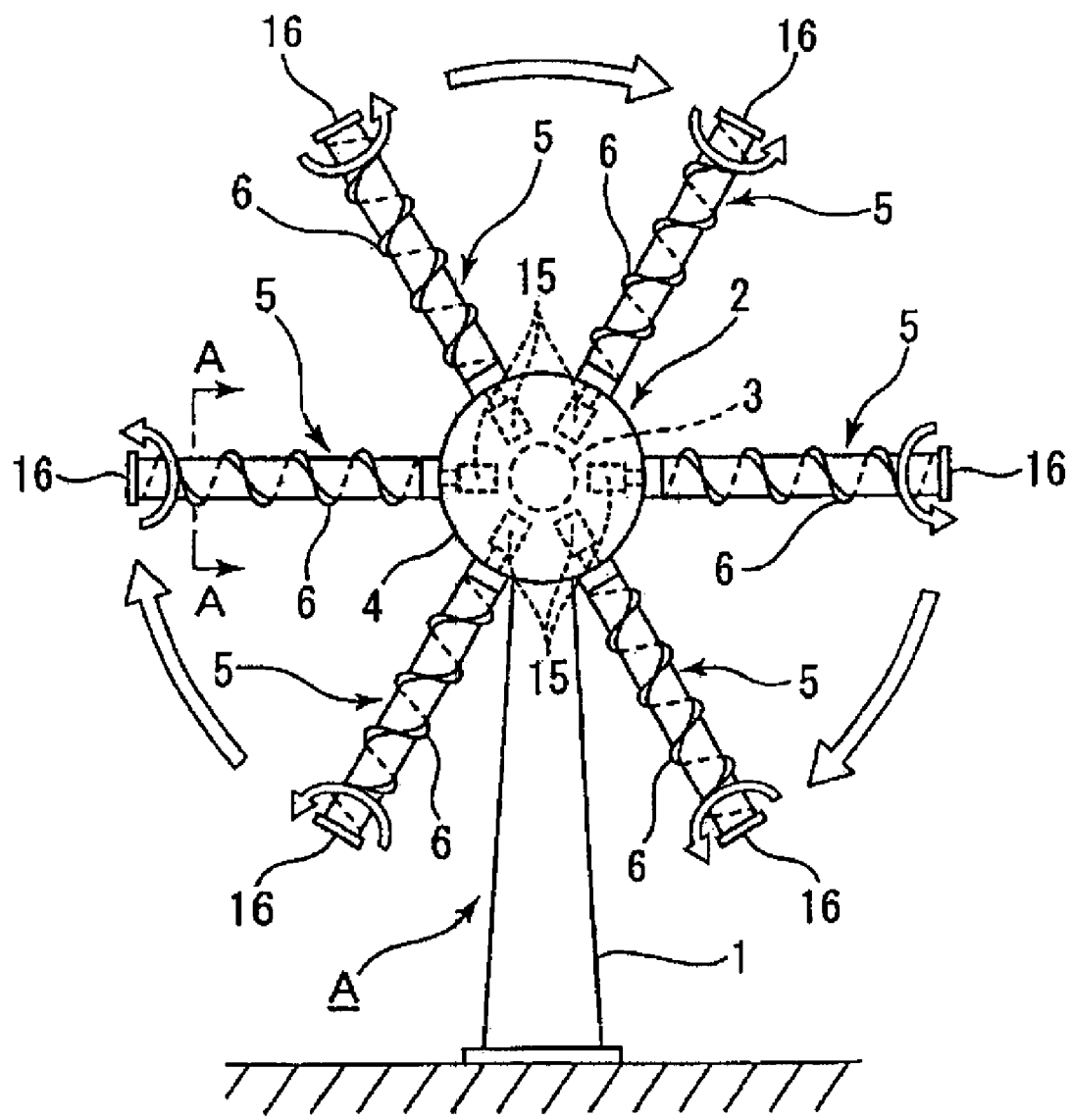
FIG. 1 is a front view showing a Magnus type wind power generator according to an embodiment 1 of the present invention.

A: Magnus type wind power generator
1: Support base
2: Power generating mechanism
3: Horizontal rotary shaft
4: Rotary body
5, 5b, 5c: Rotary column
5d, 5e: Rotary column
5f, 5g: Rotary column
6, 6b, 6c: Rib (air flow means, fin member)
6e, 6f: Rib (air flow means, fin member)
6g: Fin (air flow means)
7b, 7c: Dimple
8b, 8c: Covering material
9b, 9c: Combined body
10c: Top surface (outer surface of extreme end)
15: Driving motor
16, 16d: End cap
16e, 16f: End cap
16g: End cap
17d: Groove (air flow means)

19: Inner cylinder
20: Outer cylinder
21: Support base
23: Horizontal rotary shaft
24: Rotary body
25: Rotary column
26: Rib (air flow means, fin member)
35: Driving motor
39: Inner cylinder
40: Outer cylinder
41: Rotary body
42: Horizontal rotary shaft
43: Rotary column
44: Driving motor
45, 46: Bevel gear

BEST MODE FOR CARRYING OUT THE INVENTION

A description will now be given of embodiments of the present invention.

Embodiment 1

Figure 2:
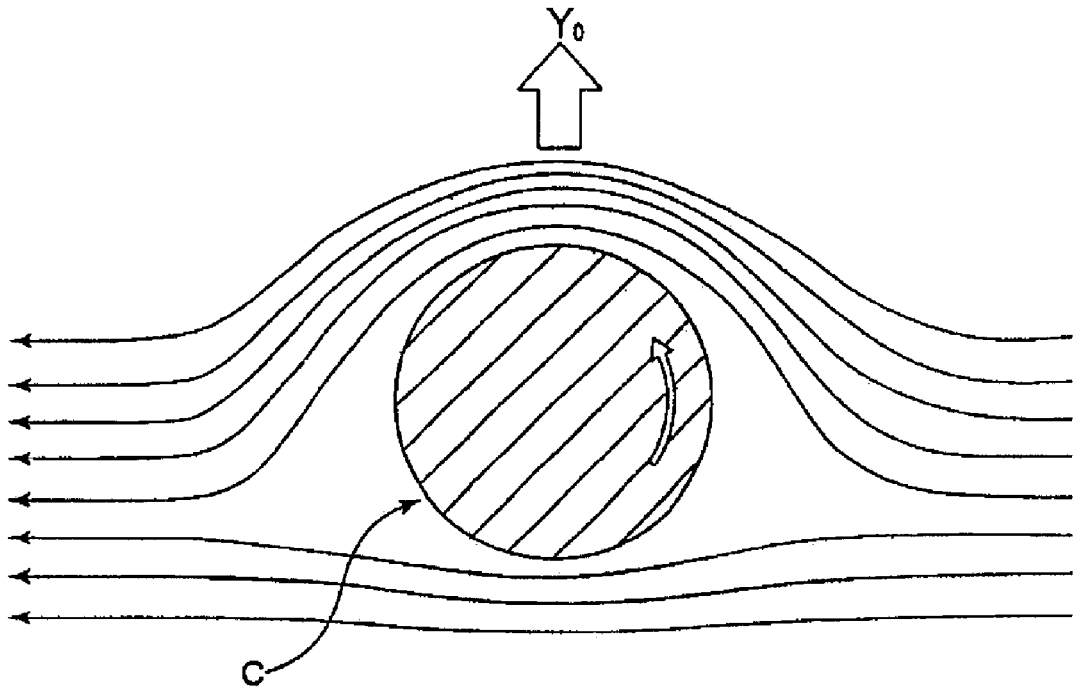
FIG. 2 is a descriptive diagram of Magnus lift.
Figure 3:
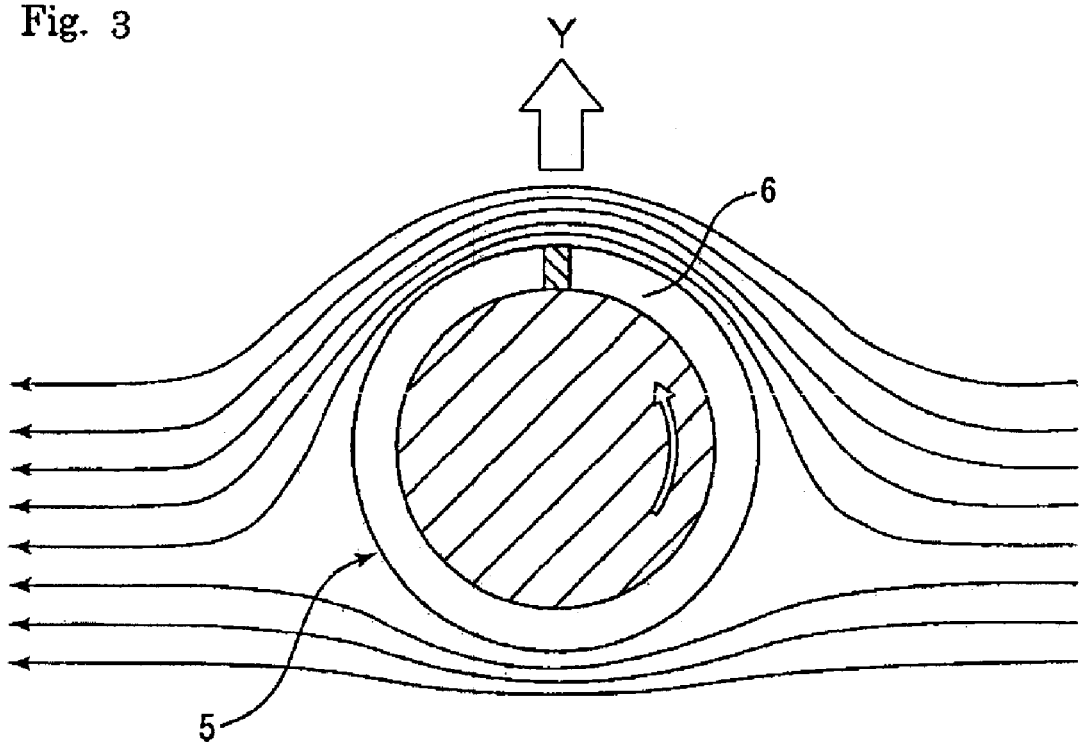
FIG. 3 is a cross sectional view of a rotary column made in a plane and in a direction indicated by A in FIG. 1.
Figure 4:
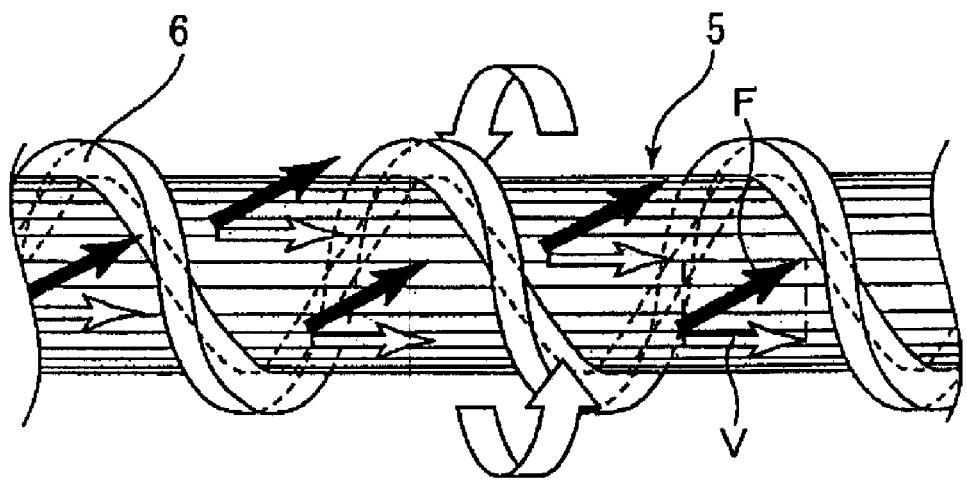
FIG. 4 is a front view showing the rotary column provided with a rib.

A description will now be given of a Magnus type wind power generator according to an embodiment of the present invention based upon the drawings where FIG. 1 is a front view showing the Magnus type wind power generator according to an embodiment 1 of the present invention, FIG. 2 is a descriptive diagram of Magnus lift, FIG. 3 is a cross sectional view of a rotary column made in a plane and in a direction indicated by A in FIG. 1, and FIG. 4 is a front view showing the rotary column provided with a rib.

A description will be given of a mechanism to generate general Magnus lift. As shown in FIG. 2, a flow of air which has come in contact with a front side of a rotary column C flows upward as the rotary column C rotates upon the rotational direction of the rotary column C and the direction of the air flow shown in FIG. 2. On this occasion, air flowing above the rotary column C flows faster than air flowing below the rotary column C, there is thus generated a Magnus effect where a difference in air pressure is generated due to a negative pressure above the column C and a positive pressure therebelow, resulting in a Magnus lift $Y_0$ being generated upon the rotary column C in a direction perpendicular to the air flow.

Reference numeral A in FIG. 1 denotes a Magnus type wind power generator to which the present invention is applied. In this Magnus type wind power generator A, a power generating mechanism 2 journalled to turn in a horizontal direction about a vertical motor (not shown) is disposed in a top portion of a support base 1 erected upon the ground. The power generating mechanism 2 includes a horizontal rotary shaft 3 journalled to rotate in the vertical direction, one end of the horizontal rotary shaft 3 is connected to a power generator (not shown) provided within the power generating mechanism 2, and the other end of the horizontal rotary shaft 3 is fixed to a rotary body 4.

As shown in FIG. 1, six driving motors 15 are provided within the rotary body 4, six rotary columns 5 are radially provided upon an outer periphery of the rotary body 4, base portions of the respective rotary columns 5 are connected to the respective driving motors 15 provided within the rotary body 4, and the respective rotary columns 5 are journalled so as to be rotated by the drive of the respective driving motors 15. Moreover, upon the distal end surfaces of the rotary columns 5 are attached end caps 16 in a disk shape having a diameter larger than the diameter of the rotary columns 5.

Upon axial outer peripheral surfaces of the rotary columns 5, fin members serving as air flow means according to the present embodiment, namely ribs 6 in a spiral shape are formed to integrally wind therearound. The ribs 6 may be made of a material such as synthetic resin or a material such as weather resistant light alloy. A description will now be given of the rib 6. As shown in FIG. 4, one rib 6 with a required width and a required height is fixed so as to form a right-hand spiral in a right-hand thread shape as viewed from the extreme end surface of the rotary column 5.

When the Magnus type wind power generator A shown in FIG. 1 is used to generate an electric power, a wind direction is first detected by a wind vane (not shown), a control circuit (not shown) drives the vertical motor (not shown) to turn the power generating mechanism 2 according to the wind direction so that the wind blows against the front side of the rotary body 4. Then, the respective rotary columns 5 are rotated by the drive of the respective driving motors 15 within the rotary body 4.

A detailed description will now be given of the rotational direction of the rotary columns 5 and the spiraling of the ribs 6. As shown in FIG. 1 and FIG. 3, if the spiral rib 6 of the rotary column 5 is wound as the right-handed helix in the right-hand thread shape as viewed from the extreme end surface of the rotary column 5, the rotational direction of the rotary column 5 rotates counterclockwise. Since the wound direction of the spiral of the rib 6 is opposite to the rotational direction of the rotary column 5, it is possible to cause air flowing upon the outer peripheral surface of the rotary column 5 to flow toward the horizontal rotary shaft 3. If the wound direction of the spiral of the rib 6 is the same as the rotational direction of the rotary column 5, it is possible to cause the air flowing upon the outer peripheral surface of the rotary column 5 to flow in a direction departing from the horizontal rotary shaft 3 (radially outward direction).

As shown in FIG. 4, by providing the spiral rib 6 upon the rotary column 5, the spiral rib 6 generates flows F of the air during the rotation of the rotary column 5. On this occasion, upon the outer peripheral surface of the rotary column 5 can be generated flow components V of the air parallel with the axes of the rotary column 5 other than a natural wind and the movement of the air in a surface layer of the rotary column 5 rotating with the rotary column 5.

As shown in FIG. 3 and FIG. 4, by generating the air flows in the outer periphery of the rotary column 5, namely the air flows F upon the outer peripheral surface of the rotary column 5, there are generated three dimensional air flows formed by the natural wind and the movement of the air in the surface layer of the rotary column 5 rotating with the rotary column 5.

As confirmed by experiments described later, Magnus lift Y generated by interactions between the rotation of the respective rotary columns 5 and wind power are increased (refer to FIG. 3). On this occasion, all the air flows F generated by the air flow means are not necessarily parallel with the rotary columns 5, and a sufficient effect is provided if the air flows F have at least the vector components V parallel with the rotary columns 5. It is considered that there occur a phenomenon of an increase of the differential pressure between the negative pressure and the positive pressure acting upon the rotary columns 5, a phenomenon of an increase of a surface to generate the lift, and the like as reasons for the increase of the Magnus lift Y.

Moreover, by employing the end caps 16, an increase of the Magnus effect has experimentally been proven. Namely, by providing the end cap 16 upon the distal end surface of the rotary column 5, the end cap 16 exerts a positive effect upon the air flows F, thereby increasing the Magnus lift Y. Moreover, as described later, according to experiments, if the end caps 16 are provided, it was found out that this method which causes the air to flow toward the horizontal rotary shaft 5 increases the Magnus effect more than the method which causes the air to flow oppositely in the radially outward direction.

As shown in FIG. 1, the Magnus lift Y generated upon the respective rotary columns 5 rotates the rotary columns 5 and the rotary body 4 about the horizontal rotary shaft 3, thereby driving the power generator (not shown) connected to the one end of the horizontal rotary shaft 3 to generate the electric power. Moreover, by providing the ribs 6 in the spiral shape upon the rotary columns 5, a torque value (rotation torque) of the horizontal rotary shaft 3 driving the power generator (not shown) is increased, thereby increasing the electric power generation efficiency of the Magnus type wind power generator A. When the power generator (not shown) starts to generate an electric power, a part of the generated electric power can be supplied to the driving motors 15 used to rotate the rotary columns 5 as an auxiliary electric power to be used.

Proof experiments for the rotary columns 5 used for the present embodiment were carried out in a wind tunnel experimental room. A description will now be given of a tip speed ratio θ and a lift coefficient Cy for the rotary column 5 of the Magnus type wind power generator A according to the present embodiment, rotary columns in other inventions, and ideal fluid with reference to Table 1. Table 1 is a chart showing a relationship between the tip speed ratio θ and the lift coefficient Cy. If the diameter (m) of the rotary column is d, the rotational speed per second (r/s) of the rotary column is n, and the wind speed (m/s) is u, the tip speed ratio θ of the rotary column is represented as θ=dn/u. The lift coefficient Cy is a value obtained by dividing the lift Y by a product of an energy of movement of the wind per unit volume: $(1/2)\rho u^2$ and a projected area of the rotary column: dl (l is the length of the rotary column), and is represented as Cy=2θ for the ideal fluid. The tip speed ratio θ is used to keep variations in experiment results according to differences in the diameter d, the rotational speed n, and the wind speed u as less as possible, and the lift coefficient Cy is also used to keep variations in experiment results according to the wind speed u, the dimension dl of the rotary column, and the density of the fluid σ as less as possible.

As shown in Table 1, plot (A) represents a relationship between the tip speed ratio θ and the lift coefficient Cy of the rotary column 5 of the Magnus type wind power generator A according to the present invention, plot (B) represents a relationship between the tip speed ratio θ and the lift coefficient Cy of a rotary column of a Magnus type wind power generator according to ITAM (Russia), and plot (C) represents a relationship between the tip speed ratio θ (converted value corresponding to the tip speed ratio θ of a rotary column) and the lift coefficient Cy of a wing of an NACA 4415 (propeller wing with an attack angle of 12 degrees) often employed for a propeller wind turbine type wind power generator.

If plot (A) of the rotary column 5 of the present invention is compared with plot (B) of the rotary column of ITAM and the plot (C) of the wing of NACA4415, plot (A) of the rotary column 5 of the present invention presents a curve close to a chart of the ideal fluid (fluid which ideally flows, and does not present a loss, and for which it is not necessary to consider a friction and a separation).

Especially, a comparison between plot (A) of the rotary column 5 of the present invention and plot (B) of the rotary column of the ITAM shows that the lift coefficient Cy of plot (A) of the rotary column 5 of the present invention is higher than the lift coefficient Cy of plot (B) of the rotary column of ITAM in a state where the tip speed ratio θ is low (θ is equal to or less than approximately 1.5).

This shows that the rotary column 5 of the Magnus type wind power generator A according to the present invention can most efficiently generate the Magnus lift Y in a state where the rotational speed n of the rotary column is low, and since the Magnus type wind power generator A according to the present invention can rotate the horizontal rotary shaft 3 with high Magnus lift Y even if the rotational speed n of the rotary columns 5 is low, it is possible to save power consumptions of the driving motors 15 used to rotatively drive the rotary columns 5, thereby efficiently generating the electric power.

A description will now be given of the end caps 16 of the Magnus type wind power generator A according to the present embodiment, a torque value N (rotation torque) of the horizontal rotary shaft 3 in the power generating mechanism 2, and the tip speed ratio θ with reference to Table 2 and Table 3. Hereinafter, in the present embodiment, the rotational direction of the rotary column 5 which causes the air flowing upon the outer peripheral surface of the rotary columns 5 to flow toward the horizontal rotary shaft 3 is referred to as a forward rotation, and the rotational direction of the rotary column 5 which causes the air flowing upon the outer peripheral surface of the rotary columns 5 to flow in the direction departing from the horizontal rotary shaft 3 is referred to as a reverse rotation.

Table 2 is a chart representing relationships between the tip speed ratio θ and the torque value N upon the rotary columns 5 with a diameter of 70Φ being rotated forward where plot (a) shows a relationship between the tip speed ratio θ and the torque value N of the rotary column 5 without the spiral rib 6 and the end cap 16 being provided, plot (b) shows a relationship between the tip speed ratio θ and the torque value N of the rotary column 5 with the spiral rib 6 being provided, plot (c) shows a relationship between the tip speed ratio θ and the torque value N of the rotary column 5 with the spiral rib 6 being provided and the end cap 16 with a diameter of 140Φ being attached, and plot (d) shows a relationship between the tip speed ratio θ and the torque value N of the rotary column 5 with the spiral rib 6 being provided and the end cap 16 with a diameter of 200Φ being attached.

A comparison between plot (a) of the rotary column 5 without the spiral rib 6 and plot (b) of the forward rotation of the rotary column 5 with the spiral rib 6 shows that since the rib 6 increases the Magnus lift Y generated upon the rotary column 5, the torque value N of plot (b) of the rotary column 5 with the rib 6 is higher than the torque value N of plot (a) of the rotary column 5 without the rib 6.

Moreover, for plot (b) and plot (c) of the forward rotation of the rotary column 5 with the spiral rib 6, a comparison between plot (b) of the rotary column 5 without the end cap 16 and plot (c) of the rotary column 5 with the end cap 16 with the diameter of 140Φ shows that the end cap 16 causes an increase of the torque value N due to the Magnus effect generated in a neighborhood of the end cap 16 upon the rotary column 5, and a large Magnus lift Y is generated in the neighborhood of the extreme end surface of the rotary column 5 by providing the end cap 16. Namely, the toque value N of plot (c) of the rotary column 5 with the end cap 16 is larger than the toque value N of plot (b) of the rotary column 5 without the end cap 16.

Upon the forward rotation, a comparison between plot (c) of the rotary column 5 with the end cap 16 with diameter of 140Φ and plot (d) of the rotary column 5 with the end cap 16 with diameter of 200Φ shows that the torque value N of plot (d) of the rotary column 5 with the end cap 16 with the larger diameter is larger than the torque value N of plot (c) of the rotary column 5 with the end cap 16 with the smaller diameter. As shown in Table 2, a larger Magnus lift Y is generated by attaching the end cap 16 to the rotary column 5 provided with the rib 6.

Table 3 is a chart representing relationships between the tip speed ratio θ and the torque value N upon the rotary columns 5 being rotated reversely where plot (a) shows a relationship between the tip speed ratio θ and the torque value N of the rotary column 5 without the spiral rib 6 and the end cap 16 being provided, plot (e) shows a relationship between the tip speed ratio θ and the torque value N of the rotary column 5 with the spiral rib 6 being provided, plot (f) shows a relationship between the tip speed ratio θ and the torque value N of the rotary column 5 with the spiral rib 6 being provided and the end cap 16 with the diameter of 140Φ being attached, and plot (g) shows a relationship between the tip speed ratio θ and the torque value N of the rotary column 5 with the spiral rib 6 being provided and the end cap 16 with the diameter of 200Φ being attached.

A comparison between plot (a) of the rotary column 5 without the spiral rib 6 and plot (e) of the reverse rotation of the rotary column 5 with the spiral rib 6 shows that since the rib 6 increases the Magnus lift Y generated upon the rotary column 5, the torque value N of plot (e) of the rotary column 5 with the rib 6 is higher than the torque value N of plot (a) of the rotary column 5 without the rib 6.

Moreover, for plot (e) and plot (f) of the reverse rotation of the rotary columns 5 with the spiral rib 6, a comparison between plot (e) of the rotary column 5 without the end cap 16 and plot (f) of the rotary column 5 with the end cap 16 with the diameter of 140Φ shows that the end cap 16 causes an increase of the torque value N due to the Magnus effect generated in a neighborhood of the end cap 16 upon the rotary column 5, and a large Magnus lift Y is generated in the neighborhood of the extreme end surface of the rotary column 5 by providing the end cap 16. Namely, the toque value N of plot (f) of the rotary column 5 with the end cap 16 is larger than the toque value N of plot (e) of the rotary column 5 without the end cap 16.

Upon the reverse rotation, a comparison between plot (f) of the rotary column 5 with the end cap 16 with diameter of 140Φ and plot (g) of the rotary column 5 with the end cap 16 with diameter of 200Φ shows that the torque value N of plot (g) of the rotary column 5 with the end cap 16 with the larger diameter is larger than the torque value N of plot (f) of the rotary column 5 with the end cap 16 with the smaller diameter. As shown in Table 3, a larger Magnus lift Y is generated by attaching the end cap 16 to the rotary column 5 provided with the rib 6.

Moreover, as shown in Table 2 and Table 3, plots (b to g) of the rotary columns 5 provided with the air flow means such as the rib 6 present the increased torque values N compared with plot (a) of the rotary column 5 without the air flow means. Based upon the experimental results, there can be found out a novel principle that the Magnus lift Y generated by the interactions between the rotations of the respective rotary columns 5 and the wind power is increased by the generation of the air flows upon the outer peripheral surfaces of the rotary columns 5 other than the natural wind and the air movement in the surface layers of the rotary columns 5 rotating with the rotary columns 5. In the Magnus type wind power generator A according to the present embodiment, the power generation efficiency of the Magnus type wind power generator A is successfully increased in the wind speed range from the low wind speed to the relatively high wind speed by increasing the torque value N of the horizontal rotary shaft 3 driving the power generating mechanism 2. Moreover, it has experimentally been proven that the Magnus effect increases upon the end caps 16 being attached when the air flows are generated.

Further, in the comparison between Table 2 and Table 3, a comparison between plots (b to d) of the forward rotation of the rotary columns 5 and plots (e to g) of the reverse rotation of the rotary columns 5 shows that the torque value N increases in the cases where the air flowing upon the outer peripheral surface of the rotary column 5 flows toward the horizontal rotary shaft 3. Based upon this experimental results, upon the end caps 16 being provided, the method to cause the air to flow in the direction toward the horizontal rotary shaft 3 increases the Magnus effect more compared with the method to cause the air to flow in the direction departing from the horizontal rotary shaft 3 (radially outward direction).

A description will now be given of the ribs 6 of the Magnus type wind power generator A according to the present embodiment, the torque value N (rotation torque) of the horizontal rotary shaft 3 in the power generating mechanism 2, and the wind speed u with reference to Table 4. Table 4 is a chart showing a relationship between the wind speed u and the torque value N when the rotary column 5 is rotated at a rotational speed of 1080 [min$^{-1}$] where plot (h) shows a relationship between the wind speed u and the torque value N for the rotary column 5 without the spiral rib 6, and plot (i) shows a relationship between the wind speed u and the torque value N for the rotary column 5 with the spiral rib 6.

Namely, a comparison between plot (h) of the rotary column 5 without the rib 6 as means to add the air flows along the rotary column 5 and plot (i) of the rotary column 5 with the rib 6 shows that although the torque value N of plot (h) of the rotary column 5 without the rib 6 is approximately constant independently of the wind speed u, the torque value N of plot (i) of the rotary column 5 with the rib 6 increases as the wind speed u increases, which shows that the wind power is efficiently converted into the Magnus lift Y.

This shows that the rotary columns 5 of the Magnus type wind power generator A according to the present invention can generate the Magnus lift Y most efficiently from the normal condition where the wind speed of the natural wind is low to the strong wind condition where the wind speed thereof is high, a rotational efficiency of the horizontal rotary shaft 3 thus can be increased, and it is consequently possible to produce a Magnus type wind power generator A with a low energy loss, and to generate the electric power in the wind speed range from the low wind speed to the high wind speed of the natural wind.

Moreover, as shown in Table 4, in plot (h) of the rotary column 5 without the rib 6, if the wind speed u becomes 20 m, an inverse Magnus effect is generated to cause the torque value N to present a negative value, while the rotary column 5 provided with the rib 6 shown in plot (i) is hardly affected by the inverse Magnus effect, thereby increasing the torque value N.

Then, a proof experiment was carried out outdoors using the Magnus type wind power generator A according to the present embodiment, and a description will now be given of the wind speed and generated power outputs W of the Magnus type wind power generator A according to the present embodiment and a propeller wind turbine type wind power generator with reference to Table 5. Table 5 is a chart showing a relationship between the wind speed and the generated power outputs W of the Magnus type wind power generator A according to the present embodiment and the propeller wind turbine type wind power generator, each having a wind turbine diameter of 2 m, where plot (j) shows the wind speed and the generated power output W of the conventional propeller wind turbine type wind power generator, plot (k) shows the wind speed and the generated power output W of the Magnus type wind power generator A according to the present embodiment, and plot (l) shows a Rayleigh distribution of the wind speed while an average annual wind speed is 6 m (observation location: Akita prefecture).

In a neighborhood of a wind speed of 5 m where the wind speed relative frequency (%) is highest in plot (l) of the Rayleigh distribution of the annual average wind speed, a comparison between the generated power output W of plot (j) of the conventional propeller wind turbine type wind power generator and the generated power output W of plot (k) of the Magnus type wind power generator A according to the present embodiment shows that the generated power output W of plot (k) of the Magnus type wind power generator A is higher than the generated power output W of plot (j) of the conventional propeller wind turbine type wind power generator.

This implies that, for the natural wind with the wind speed in a low speed range (5 m or less), which most frequently occurs around year, the Magnus type wind power generator A according to the present embodiment can generate the electric power with a higher efficiency than the propeller wind turbine type wind power generator, and it is possible to employ the Magnus type wind power generator A according to the present embodiment to secure a more annual generated power.

Embodiment 2

A description will now be given of air flow means of a rotary column $5b$ according to an embodiment 2 with reference to FIG. 5. It should be noted that configurations same as the above-described configurations will be explained in no more detail.

Figure 5:
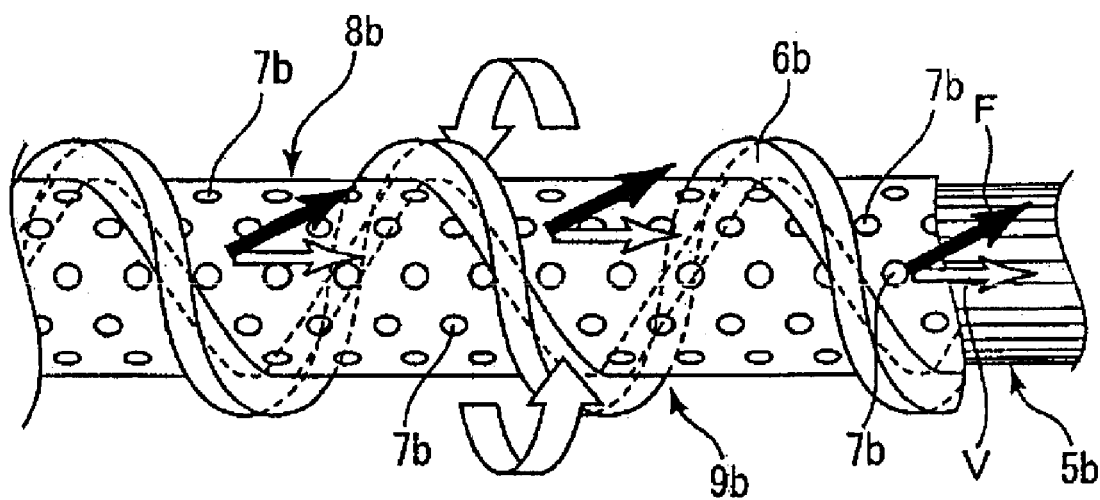
FIG. 5 is a front view showing a rotary column provided with a combined body according to an embodiment 2.

FIG. 5 is a front view showing the rotary column $5b$ provided with a combined body $9b$ according to the embodiment 2. A surface of a covering material $8b$ made of a synthetic resin or weather resistant light alloy are recessed and projected to form a large number of dimples $7b$. Upon an axial outer surface of the rotary column $5b$ is integrally covered with the combined body $9b$ which is the combination of the dimples $7b$ with a fin member serving as the air flow means according to the present embodiment integrally wound at a predetermined lead upon the surface of the covering material $8b$, namely a rib $6b$ in the spiral shape.

As shown in FIG. 5, by providing the dimples $7b$ upon the surface of the rotary column $5b$, the surface area of the rotary column $5b$ is increased, and, at the same time, the multiple dimples $7b$ disturb the surface layer flows (boundary layer). The spiral rib $6b$ can cause the air to smoothly flow upon the surface of the rotary column $5b$, and the generation of the flow components V of the air flows F generated upon the outer peripheral surface of the rotary column $5b$ restrains the separation of the surface layer flows to increase the circulation, thereby increasing the Magnus lift Y generated upon the rotary column $5b$.

It should be noted that a large number of the dimples $7b$ may be directly formed by recessing and projecting the surface of the rotary column $5b$ without using the covering material $8b$, and the rib $6b$ may be wound around the surface of the rotary column $5b$ upon which the dimples $7b$ are formed by recessing and projecting. The dimples $5b$ intended herein may have any shapes as long as they form recesses and projections to disturb the surface layer flows.

Embodiment 3

A description will now be given of air flow means of a rotary column $5c$ according to an embodiment 3 with reference to FIG. 6. It should be noted that configurations same as the above-described configurations will be explained in no more detail.

Figure 6:
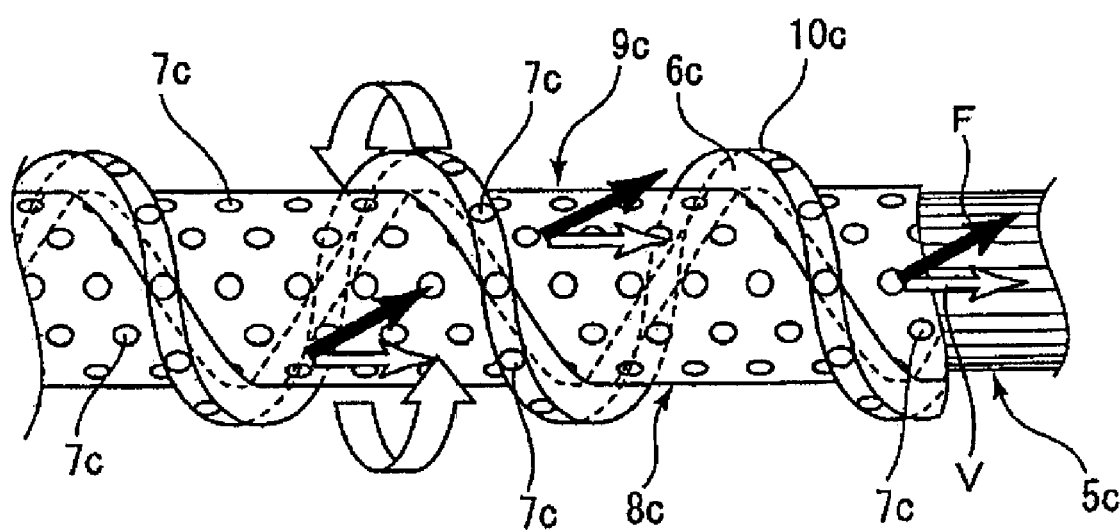
FIG. 6 is a front view showing a rotary column where dimples are provided upon a rib of a combined body according to an embodiment 3.

FIG. 6 is a front view showing a rotary column $5c$ where dimples $7c$ are provided upon a rib $6c$ of a combined body $9c$ according to the embodiment 3, and an axial outer peripheral surface of the rotary column $5c$ is integrally covered with the combined body $9c$ which combines a covering material $8c$ upon which a large number of the dimples $7c$ are formed by recessing and projecting, a fin member serving as the air flow means according to the present embodiment, namely the spiral rib $6c$, provided upon the covering material $8c$, and a large number of the dimples $7c$ formed by recessing and projecting a top surface $10c$ as an extreme end surface, according to the present embodiment, of the spiral rib $6c$.

As shown in FIG. 6, since there are formed a large number of the dimples $7c$ upon the top surface $10c$ of the spiral rib $6c$ in addition to a large number of the dimples $7c$ formed by recessing and projecting the covering material $8c$, and the multiple dimples $7c$ disturb the surface layer flows (boundary layer), the Magnus lift Y generated upon the rotary column $5c$ increases. Moreover, the rib $6c$ can cause the air to smoothly flow upon the surface of the rotary column $5c$, and it is thus possible to generate the air flow components V of the air flows F generated upon the outer peripheral surface of the rotary column $5c$.

Upon the top surface $10c$ as the extreme end surface of the rib $6c$ of the combined body $9c$, projections in a hemispherical shape may be formed by projection in addition to the dimples $7c$, and the dimples $7c$ and the projections disturb the surface layer flows upon the extreme end surface of the rib $6c$, and restrain the separation thereof to increase the circulation, thereby additionally increasing the Magnus lift Y generated upon the rotary column $5c$.

Embodiment 4

A description will now be given of air flow means of a rotary column $5d$ according to an embodiment 4 with reference to FIG. 7. It should be noted that configurations same as the above-described configurations will be explained in no more detail.

Figure 7:
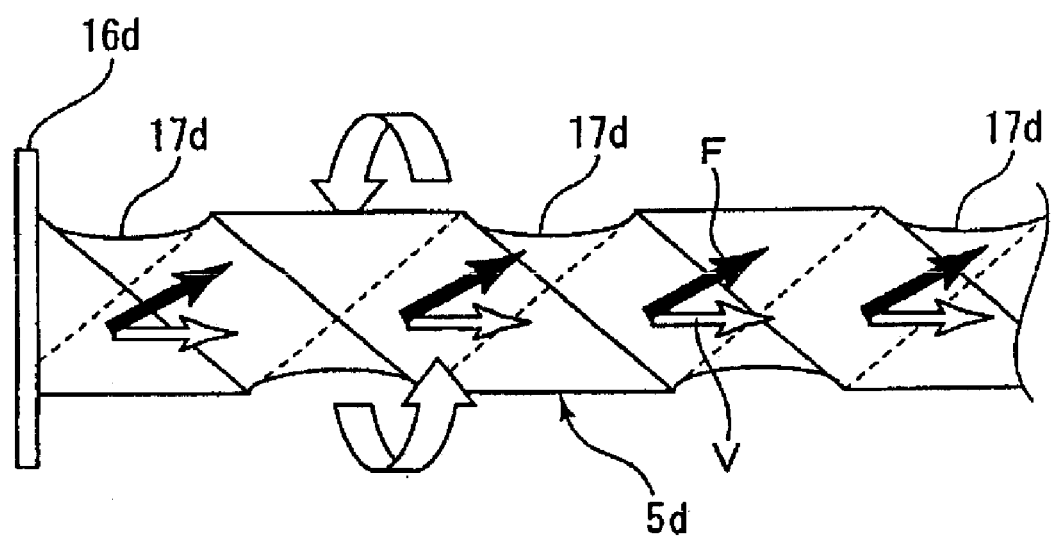
FIG. 7 is a front view showing a rotary column provided with a groove according to an embodiment 4.

FIG. 7 is a front view showing the rotary column $5d$ provided with a groove $17d$ according to the embodiment 4. An axial outer peripheral surface of the $5d$ is recessed to form the spiral groove $17d$ serving as the air flow means according to the present embodiment, and the groove $17d$ is formed as a right-handed helix in a right-hand thread shape as viewed from an extreme end surface of the rotary column $5d$, and an end cap $16d$ is attached to the extreme end surface of the rotary column $5d$.

Moreover, when the rotary column $5d$ is rotated, the rotational direction of the rotary column $5d$ is counterclockwise if the groove $17d$ is formed as the right-handed helix in the right-hand thread shape as viewed from the extreme end surface of the rotary column $5d$, and the winding direction of the spiral of the groove $17d$ is thus opposite to the rotational direction of the rotary column $5d$.

As a result, the air flowing upon the outer peripheral surface of the rotary column $5d$ can be caused to flow toward the horizontal rotary shaft, and it is possible to generate the air flows F upon the outer peripheral surface of the rotary column 5d, thereby generating the air flow components V parallel with the axis of the rotary column 5d, resulting in an increase of the Magnus lift Y generated upon the rotary column 5d. Simultaneously, the end cap 16d provided upon the extreme end surface of the rotary column 5d is caused to affect air flows in a neighborhood of the end cap 16d thereby generating a large Magnus lift Y in the neighborhood of the end cap 16d of the rotary column 5d.

Embodiment 5

A description will now be given of air flow means of a rotary column 5e according to an embodiment 5 with reference to FIG. 8 and FIG. 9. It should be noted that configurations same as the above-described configurations will be explained in no more detail.

Figure 8:
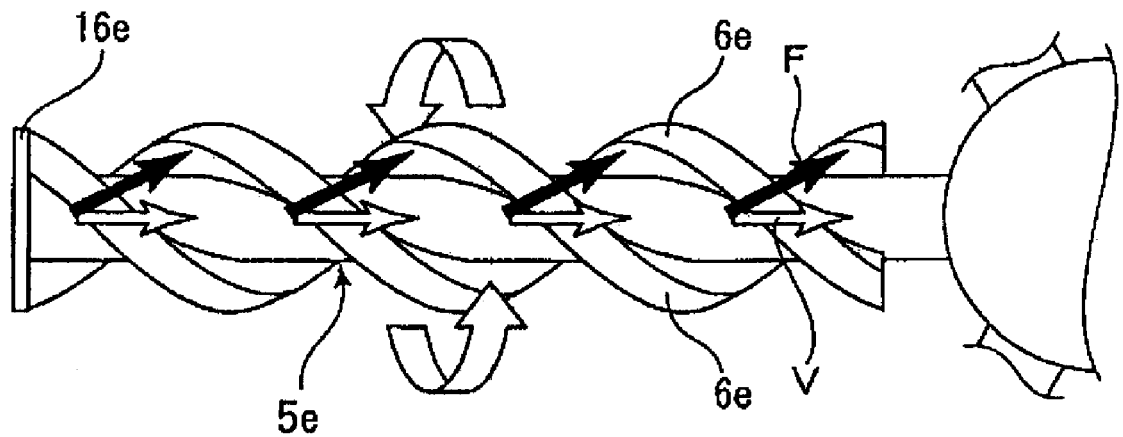
FIG. 8 is a front view showing a rotary column provided with two ribs according to an embodiment 5.
Figure 9:
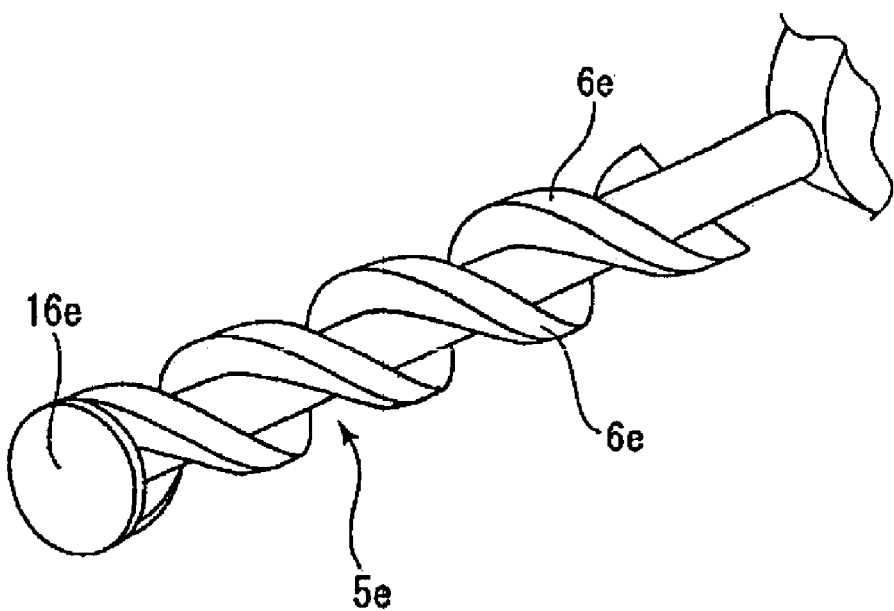
FIG. 9 is a perspective view showing the rotary column provided with the two ribs.

FIG. 8 is a front view showing the rotary column 5e provided with two ribs 6e according to the embodiment 5, and FIG. 9 is a perspective view showing the rotary column 5e provided with the two ribs 6e where the fin members serving as air flow means according to the present embodiment, namely the two spiral ribs 6e are attached upon an axial outer peripheral surface of the rotary column 5e, the ribs 6e forming a double-helix are fixed so as to form a right-handed helix in a right-hand thread shape as viewed from an extreme end surface of the rotary column 5e, and an end cap 16e is attached to the extreme end surface of the rotary column 5e.

It should be noted that the ribs 6e provided upon the rotary column 5e are not limited to the two-streak spiral, and may be configured by a multi-streak spiral such as spiral having three, four, or more streaks. By providing a large number of the ribs 6e, it is possible to cause more air to smoothly flow upon the surface of the rotary column 5e by means of the ribs 6e, and it is thus possible to generate the air flows F upon the outer peripheral surface of the rotary column 5e, thereby generating the air flow components V parallel with the axis of the rotary column 5e, resulting in an increase of the Magnus effect generated upon the rotary column 5e and an increase of the Magnus lift Y.

Embodiment 6

A description will now be given of air flow means of a rotary column 5f according to an embodiment 6 with reference to FIG. 10. It should be noted that configurations same as the above-described configurations will be explained in no more detail.

Figure 10:
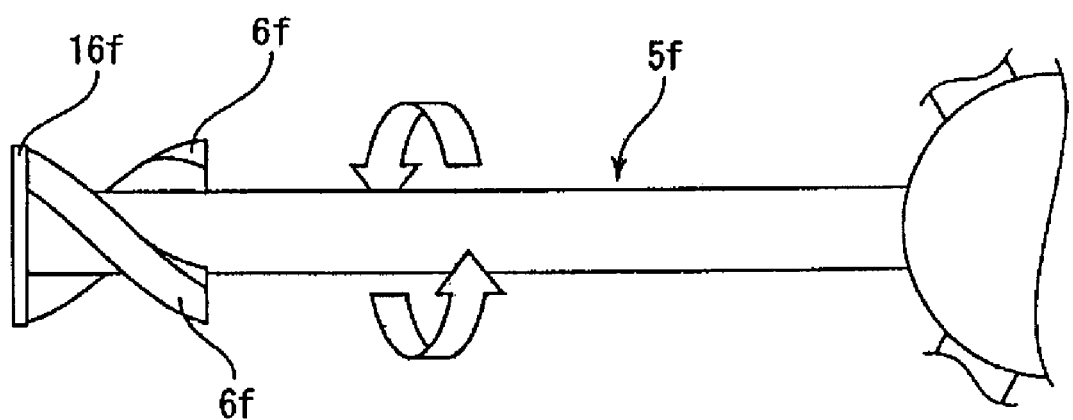
FIG. 10 is a front view showing a rotary column according to an embodiment 6.

FIG. 10 is a front view showing the rotary column 5f according to the embodiment 6, an end cap 16f is attached to an extreme end of the rotary column 5f, and fin members serving as air flow means according to the present embodiment, namely two ribs 6f are attached upon an axial outer peripheral surface in a neighborhood of the extreme end of the rotary column 5f. By providing the end cap 16f upon the extreme end of the rotary column 5f, and simultaneously, providing the ribs 6f in the neighborhood of the extreme end of the rotary column 5f, it is possible to increase the Magnus lift Y generated in the neighborhood of the extreme end of the rotary column 5f.

Embodiment 7

A description will now be given of air flow means of a rotary column 5g according to an embodiment 7 with reference to FIG. 11. It should be noted that configurations same as the above-described configurations will be explained in no more detail.

Figure 11:
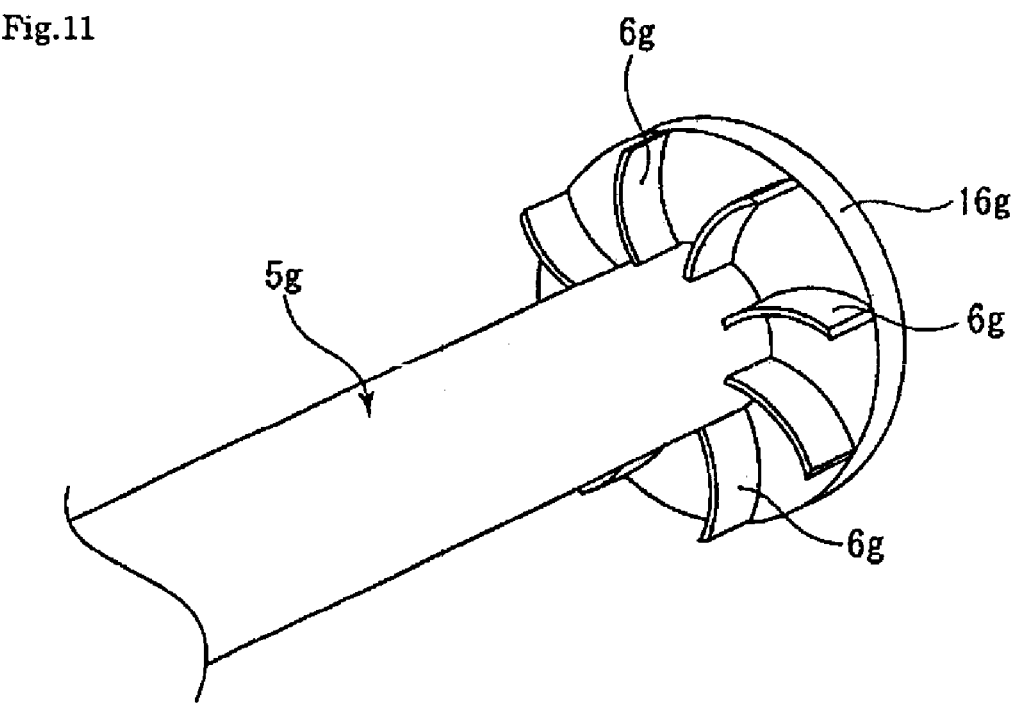
FIG. 11 is a perspective view showing an end cap according to an embodiment 7.

FIG. 11 is a perspective view showing the end cap 16g according to the embodiment 7, the end cap 16g in a disk shape is attached to an extreme end surface of the rotary column 5g, and upon a inside surface of the end cap 16g facing the rotary column 5g are provided multiple fins 6g serving as the air flow means according to the present embodiment. These fins 6g are attached to radially expand toward the outside, and simultaneously, are formed as a curved shape to cause air to flow in a neighborhood of the rotary column 5g.

If the rotary column 5g shown in FIG. 11 is rotated forward, the air in the neighborhood of the end cap 16g is caused to flow so as to be drawn toward the rotary column 5g by the fins 6g provided upon the end cap 16g, and an air flow is generated upon a surface of the rotary column 5g, thereby increasing a Magnus lift Y generated upon the rotary column 5g. If the rotary column 5g is rotated reversely, the air in the neighborhood of the end cap 16g is caused to flow so as to be released outward, and an air flow is generated upon the surface of the rotary column 5g, thereby increasing the Magnus lift Y generated upon the rotary column 5g.

Embodiment 8

A description will now be given of a Magnus type wind power generator A according to an embodiment 8 with reference to FIG. 12. It should be noted that configurations same as the above-described configurations will be explained in no more detail.

Figure 12:
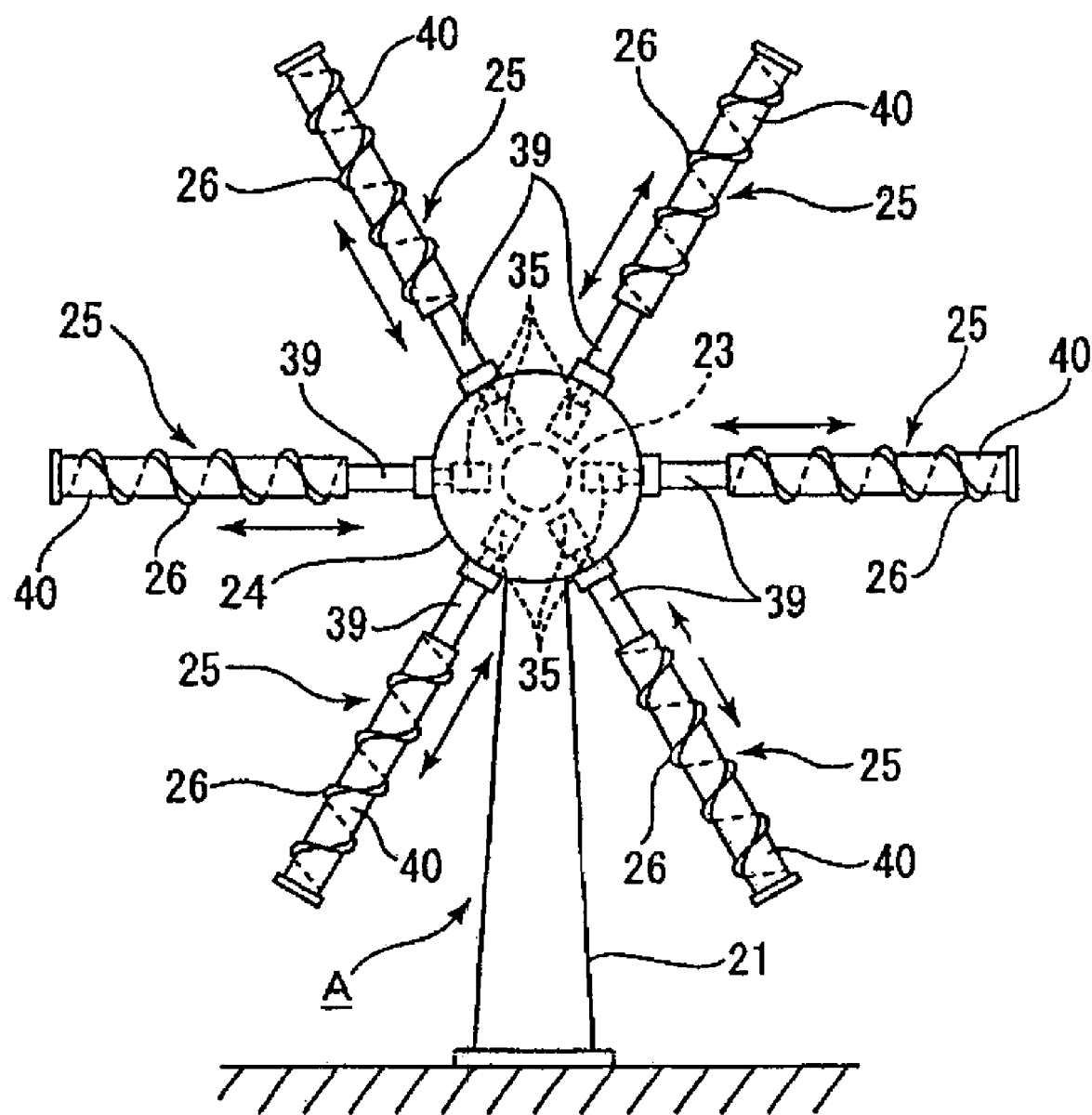
FIG. 12 is a front view showing a Magnus type wind power generator according to an embodiment 8.

FIG. 12 is a front view showing the Magnus type wind power generator A according to the embodiment 8, rotary columns 25 of the Magnus type wind power generator A are respectively constituted by an inner cylinder 39 fixed to a rotating body 24, and an outer cylinder 40 slidably attached to an outer periphery of the inner cylinder 39. The outer cylinder 40 is configured so as to slide in the radial direction with respect to the horizontal rotary shaft 23 by an extension/contraction motor (not shown) driven according to control of a control circuit (not shown).

Upon an axial outer peripheral surface of the outer cylinder 40 is fixed the fin member serving as the air flow means according to the embodiment 1 shown in FIG. 4, namely the rib 26, and an axial outer peripheral surface of the inner cylinder 39 fixed to the rotary body 24 is recessed and projected to form a large number of the dimples 7b according to the embodiment 2 shown in FIG. 5. It should be noted that the air flow means according to other embodiments 3 to 7 shown in FIG. 6 to FIG. 11 may be provided upon the inner cylinder 19 or the outer cylinder 20.

As shown in FIG. 12, since the rotary columns 25 can extend and contract, the rotary columns 25 can be extended/contracted according to the direction and the wind speed of the natural wind. In a normal state where the wind speed is low, the outer cylinders 40 of the rotary columns 25 are slid outward to extend the rotary columns 25, thereby maximizing an area of the rotary columns 25 to receive the wind, and thus increasing the Magnus lift Y generated upon the rotary columns 25, resulting in an efficient power generation of the Magnus type wind power generator A.

Moreover, upon a strong wind where the wind speed is high, the outer cylinders 40 of the rotary columns 25 are slid inward to contract the rotary columns 25, thereby reducing the wind receiving area of the rotary columns 25, resulting in preventing the support base 21 from being destroyed, and preventing the rotary columns 25 from being damaged. Further, upon the strong wind, the drive by the driving motors 35 that rotate the rotary columns 25 is stopped, and the Magnus lift Y generated upon the rotary columns 25 thus disappears, thereby stopping the rotation of the rotary body 24, resulting in preventing the Magnus type wind power generator A from being broken. Especially according to the present embodiment, since the outer cylinder 40 provided with the rib 26 is located on the side of the extreme end of the rotary column 25, the torque can be obtained as much as possible.

Embodiment 9

A description will now be given of a Magnus type wind power generator according to an embodiment 9 with reference to FIG. 13 and FIG. 14. It should be noted that configurations same as the above-described configurations will be explained in no more detail.

Figure 13:
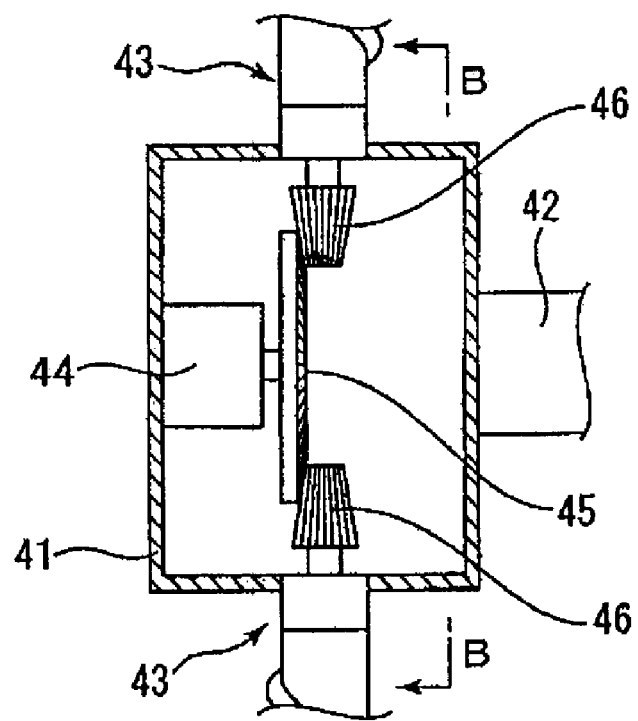
FIG. 13 is a longitudinal side cross sectional view showing a rotary body of a Magnus type wind power generator according to an embodiment 9.
Figure 14:
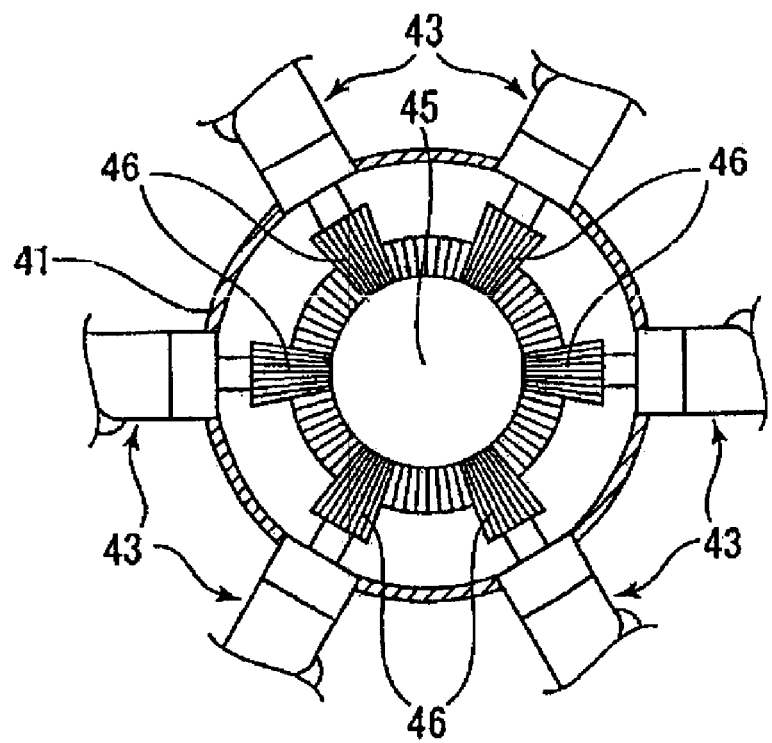
FIG. 14 is a longitudinal rear cross sectional view made in a plane and in a direction indicated by B showing the rotary body in FIG. 13.
Figure 15:
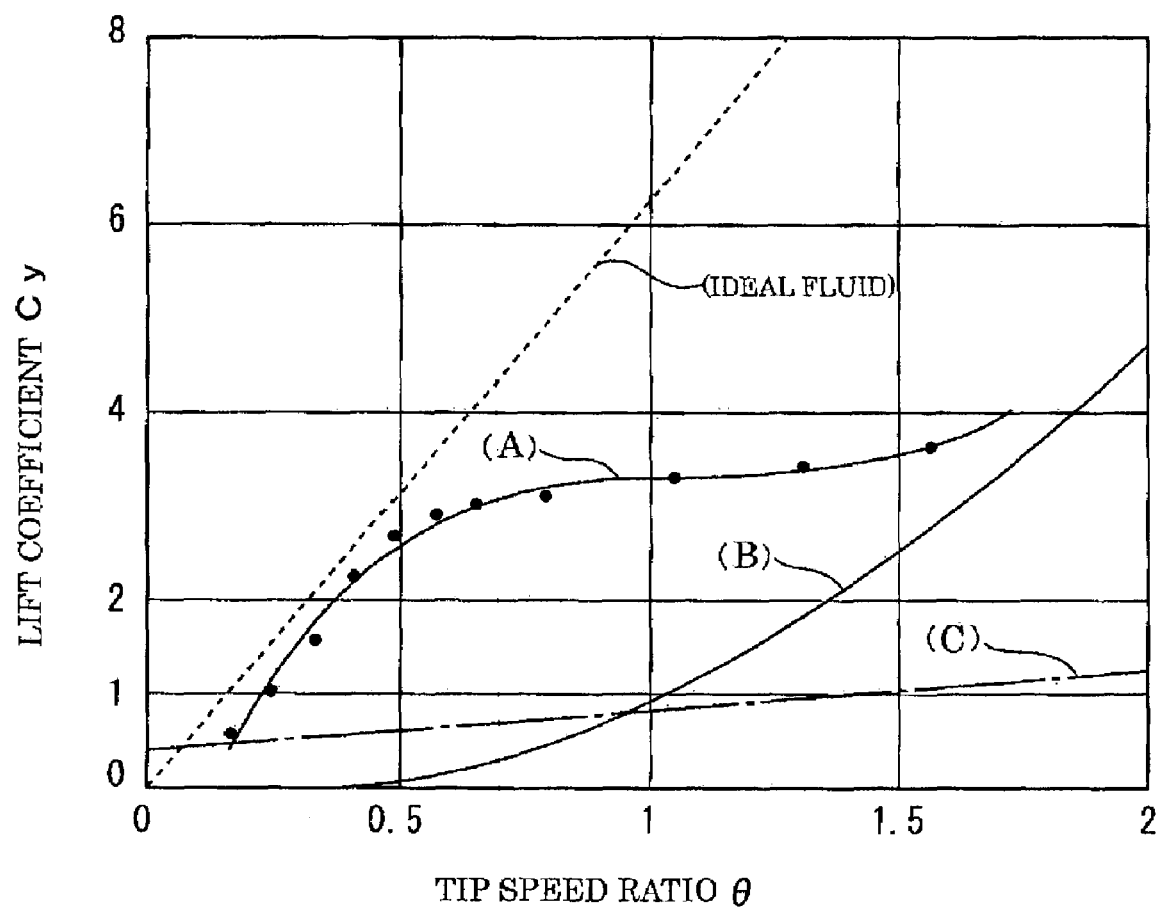
FIG. 15 is a chart showing a relationship between the tip speed ratio θ and the lift coefficient Cy.
Figure 16:
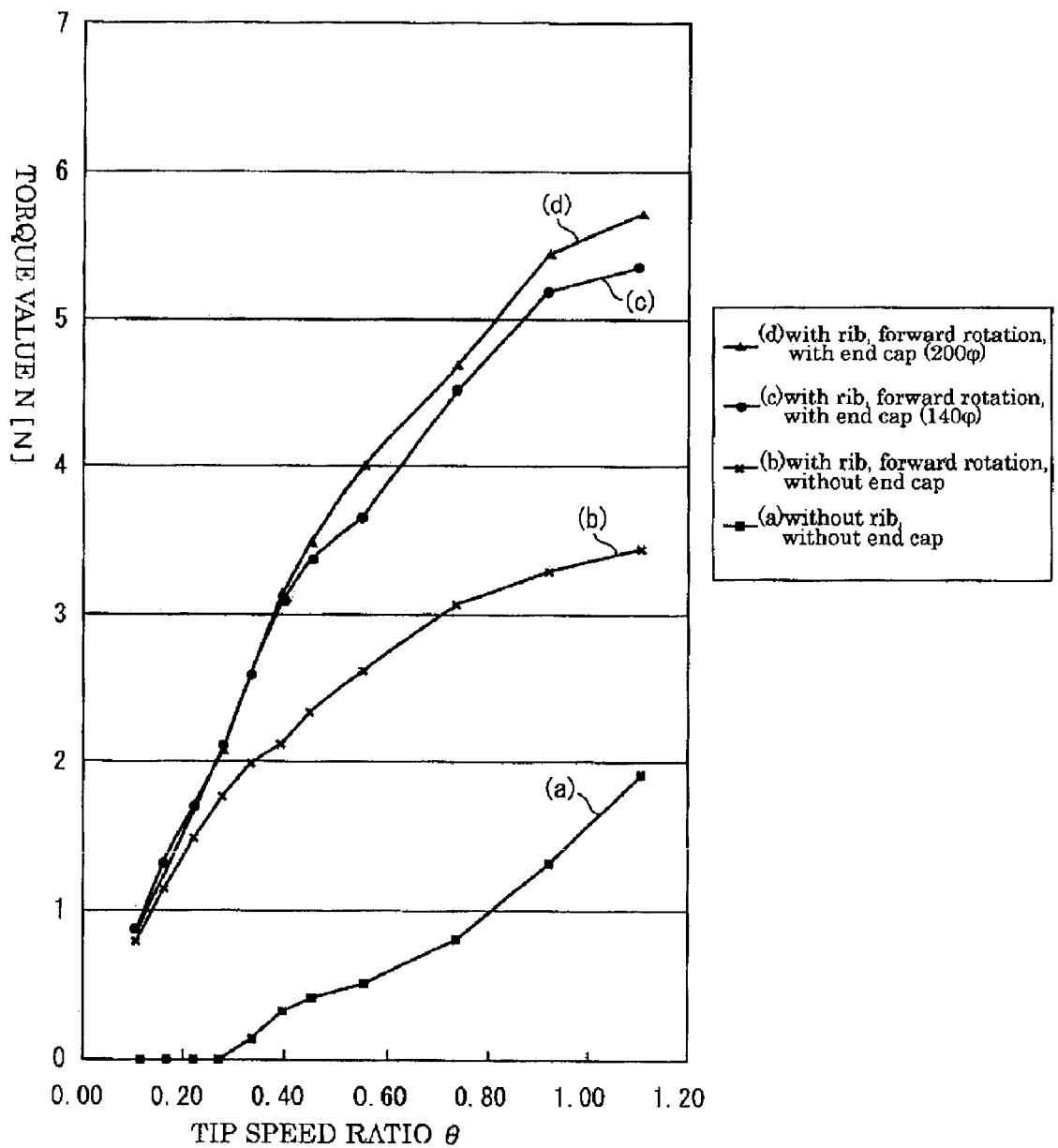
FIG. 16 is a chart representing relationships between the tip speed ratio θ and torque value N.
Figure 17:
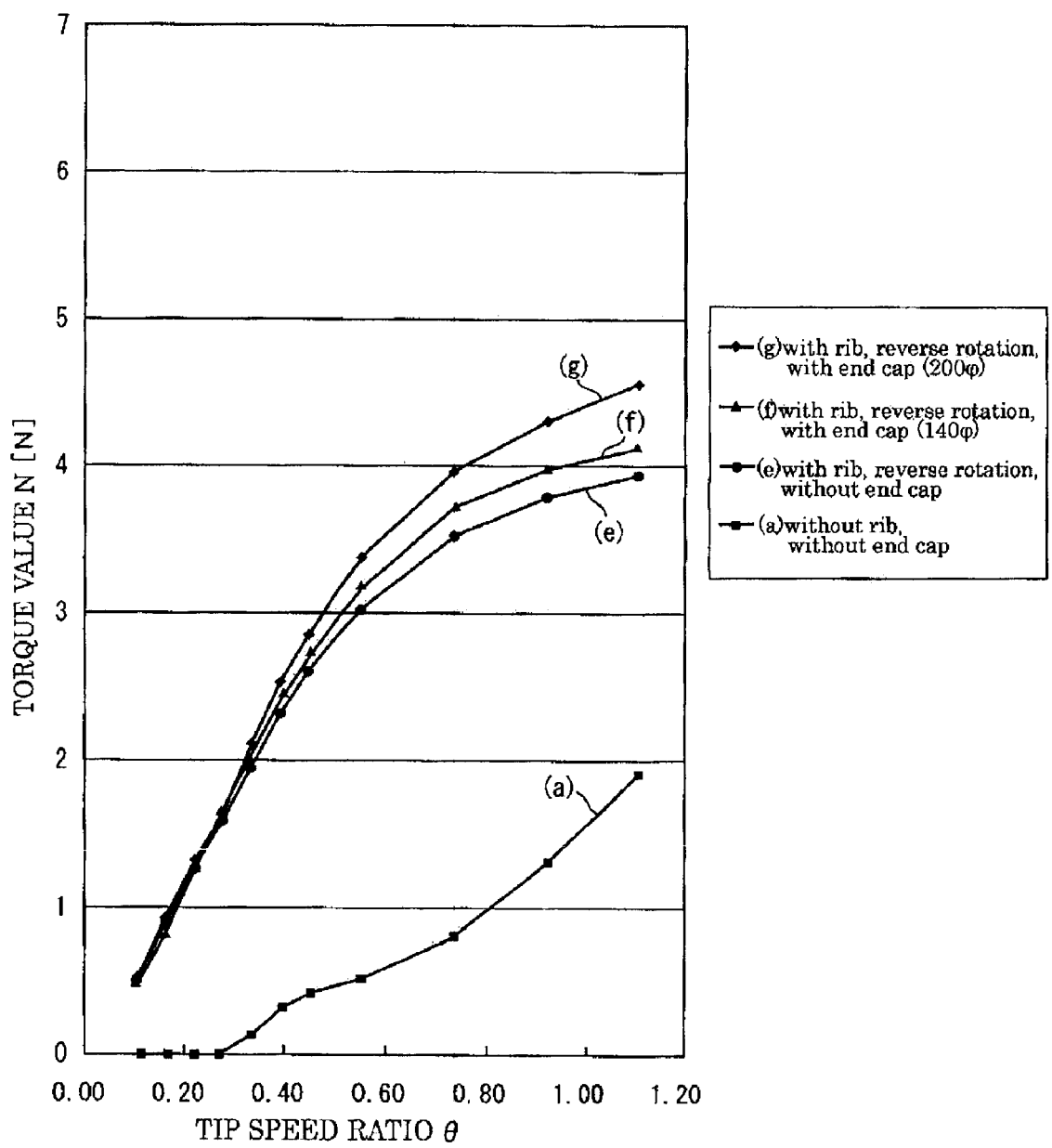
FIG. 17 is a chart representing relationships between the tip speed ratio θ and torque value N.
Figure 18:
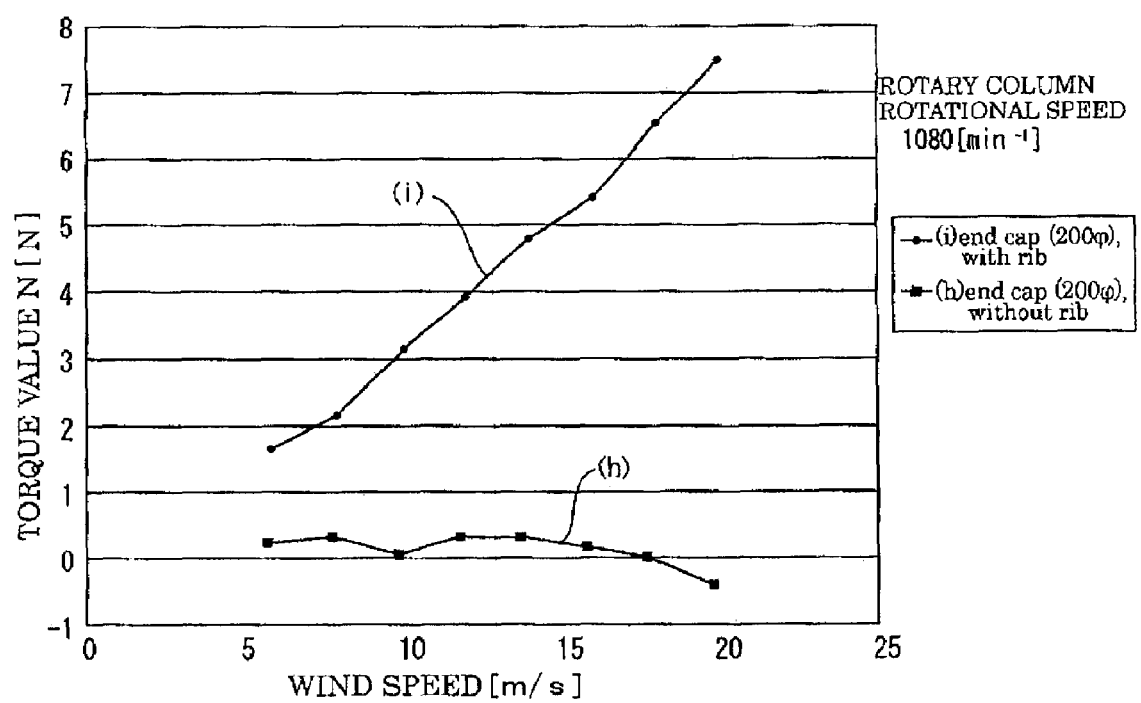
FIG. 18 is a chart showing a relationship between wind speed u and the torque value N.
Figure 19:
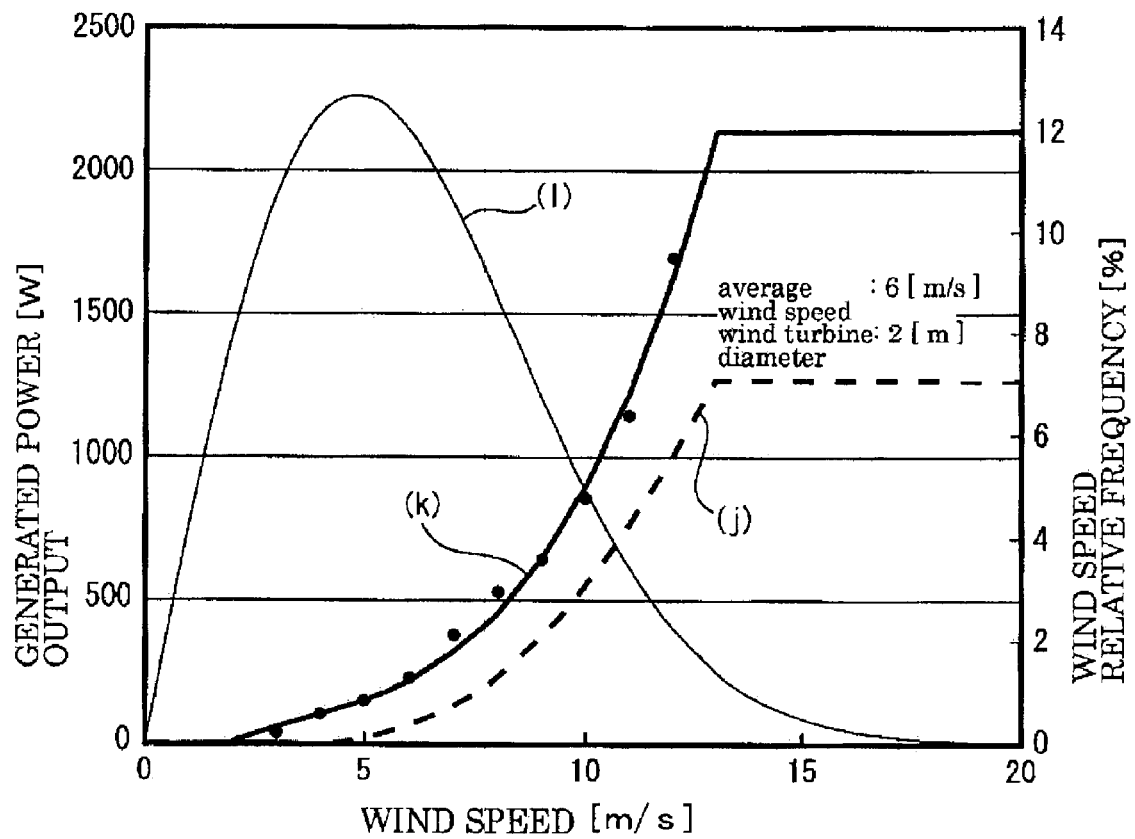
FIG. 19 is a chart showing a relationship between wind speed and generated power outputs W of the Magnus type wind power generator according to present invention.

FIG. 13 is a longitudinal side cross sectional view of a rotary body 41 of the Magnus type wind power generator according to the embodiment 9, and FIG. 14 is a longitudinal rear cross sectional view made in a plane and in a direction indicated by B showing the rotary body 41 in FIG. 13. As shown in FIG. 13, six rotary columns 43 are provided upon an outer periphery of the rotary body 41 on a front side of the horizontal rotary shaft 42 connected to the power generating mechanism, and within the rotary body 41 is provided one driving motor 44 used to rotate the rotary columns 43.

The driving motor 44 is connected to a bevel gear 45 with a large diameter, and, as shown in FIG. 14, the bevel gear 45 is disposed at the center of the rotary body 41, and is meshed with bevel gears 46 with a small diameter provided upon the six rotary columns 43. If the driving motor 44 is caused to drive, the six rotary columns 43 can be rotated. Since the driving motor 44 the number of which is smaller than the number of the rotary columns 43 can be used to drive the respective rotary columns 43, an electric power used to drive the drive motor 44 can be saved, thereby increasing the electric power generation efficiency of the Magnus type wind power generator.

Although the embodiments according to the present invention have been described with reference to the drawings, specific configurations are not limited to these embodiments, and the present invention includes modifications and additions within a scope not departing from the gist of the present invention.

For example, although the spiral rib is provided as the air flow means applied to the rotary columns, the present invention is not limited to this, and it is apparent that the air flow may be generated in any methods as long as a surface which generates lift is formed upon the surfaces of the rotary columns.

Further, although the end caps in the disk shape are provided upon the extreme end surfaces of the rotary columns, the present invention is not limited to this, and the end cap can be any shape as long as it serves to maintain a difference in pressure between the positive pressure and the negative pressure.

It should be noted that although the six rotary columns are provided upon the rotary body in the above embodiments, the present invention is not limited to this, and there may be provided two, three, or a required number of the rotary columns.

INDUSTRIAL APPLICABILITY

The Magnus type wind power generator according to the present invention can have a wide range of applications from a large-scale wind power generation to a household small wind power generation, resulting in a substantial contribution to the wind power generation industry. Moreover, when the Magnus type lift generation mechanism according to the present invention is applied to rotor ships, rotor vehicles, and the like, it is expected that an efficiency of mobility of the vehicles increase.

The invention claimed is:

1. A Magnus type wind power generator comprising a horizontal rotary shaft that transmits a rotation torque to a power generating mechanism, a plurality of rotary cylindrical columns that are disposed radially from said horizontal rotary shaft, and driving motors that rotatively drive said respective rotary cylindrical columns about axes thereof, wherein Magnus lift generated by interactions between the rotations of said respective rotary columns and wind power is caused to rotate said horizontal rotary shaft to drive said power generating mechanism, wherein each said rotary cylindrical column has a rib wound around said rotary cylindrical column in a continuous spiral shape extending from an outer peripheral surface of said rotary cylindrical column, said rib extending substantially along the length of the rotating column, and wherein said rib generates an air flow component at least parallel with an axis of said rotary cylindrical column upon the outer peripheral surface of said rotary cylindrical column, so as to increase the Magnus lift.

2. The Magnus type wind power generator according to claim 1, wherein said air flow component parallel with the axis of said rotary cylindrical column is generated in a direction departing from said horizontal rotary shaft upon the outer peripheral surface of said rotary cylindrical column.

3. The Magnus type wind power generator according to claim 1, wherein said air flow device generates an air flow component parallel with the axis of said rotary cylindrical column and in a direction toward said horizontal rotary shaft upon the outer peripheral surface of said rotary cylindrical column.

4. The Magnus type wind power generator according to claim 1, wherein an end cap larger in diameter than said rotary column is provided upon an extreme end of said rotary cylindrical column.

5. The Magnus type wind power generator according to claim 1, wherein the rib is constructed by a multi-streak spiral.

6. The Magnus type wind power generator according to claim 1, wherein a plurality of dimples are provided upon the outer peripheral surface of said rotary cylindrical column.

7. The Magnus type wind power generator according to claim 1, wherein dimples or projections are formed upon an outer surface of an extreme end of said rib.

8. The Magnus type wind power generator according to claim 1, wherein said rotary cylindrical column is supported for extension and contraction in the radial direction with respect to said horizontal rotary shaft.

9. The Magnus type wind power generator according to claim 1, wherein said driving motors are fewer in number than the number of said rotary cylindrical columns and are used to drive rotatively said respective rotary cylindrical columns simultaneously.

10. A Magnus type wind power generator comprising a horizontal rotary shaft that transmits a rotation torque to a power generating mechanism, a plurality of rotary cylindrical columns that are disposed radially from said horizontal rotary shaft, and driving motors that rotatively drive said respective rotary cylindrical columns about axes thereof, wherein Magnus lift generated by interactions between the rotations of said respective rotary columns and wind power is caused to rotate said horizontal rotary shaft to drive said power generating mechanism, wherein at a predetermined position is provided an air flow device in the form of a rib extending from an outer peripheral surface of said rotary cylindrical surface of each said rotary cylindrical columns that generates an air flow upon the outer peripheral surface of said rotary cylindrical column so as to increase the Magnus lift, and wherein said rotary cylindrical column is supported for extension and contraction in the radial direction with respect to said horizontal rotary shaft.

11. The Magnus type wind power generator according to claim 10, wherein an end cap larger in diameter than said rotary column is provided upon an extreme end of said rotary cylindrical column.

12. The Magnus type wind power generator according to claim 10, wherein a plurality of dimples are provided upon the outer peripheral surface of said rotary cylindrical column.

13. The Magnus type wind power generator according to claim 1, wherein said rib is wound around said rotary cylindrical column in a plural number of turns.

* * * * *